United States Patent
Iwakiri

(10) Patent No.: US 7,566,878 B2
(45) Date of Patent: Jul. 28, 2009

(54) RADIATION IMAGE DETECTOR

(75) Inventor: Naoto Iwakiri, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/188,560

(22) Filed: Aug. 8, 2008

(65) Prior Publication Data

US 2009/0039277 A1 Feb. 12, 2009

(30) Foreign Application Priority Data

Aug. 10, 2007 (JP) ............... 2007-208935

(51) Int. Cl.
*G01T 1/02* (2006.01)
*H01L 25/00* (2006.01)
(52) U.S. Cl. .................................. 250/370.09
(58) Field of Classification Search ..............................
250/370.01–370.15, 208.1, 214.1, 214 R;
378/98.8, 62, 207, 91, 114–116
See application file for complete search history.

(56) References Cited

U.S. PATENT DOCUMENTS

| | | | |
|---|---|---|---|
| 5,677,940 A * | 10/1997 | Suzuki et al. ............ | 378/38 |
| 5,744,807 A | 4/1998 | Weisfield | |
| 6,268,614 B1 | 7/2001 | Imai | |
| 2005/0121616 A1 * | 6/2005 | Petrick ............ | 250/370.09 |

* cited by examiner

*Primary Examiner*—David P Porta
*Assistant Examiner*—Kiho Kim
(74) *Attorney, Agent, or Firm*—Sughrue Mion, PLLC

(57) ABSTRACT

A radiation image detector includes a radiation image detector main-body having radiation detection devices for detecting radiation that are at least linearly arranged, a switching output unit having a multiplicity of switch devices, and a dummy circuit unit connected to a switch device that is switched last among the multiplicity of switch devices. The switching output unit sequentially switches columns of the radiation detection devices by the switch devices and sequentially outputs signals detected by the radiation detection devices line by line. Further, after signals are output from the radiation detection devices in a predetermined line, the dummy circuit unit outputs a signal having a magnitude that does not substantially influence signals that will be read out from the radiation detection devices in the following line of the predetermined line.

6 Claims, 10 Drawing Sheets

RADIATION IMAGE DETECTOR

BACKGROUND OF THE INVENTION

1. Field of the Invention

The present invention relates to a radiation image detector in which radiation detection devices for detecting radiation are at least linearly arranged.

2. Description of the Related Art

In recent years, FPD's (flat panel detectors), which can directly convert X-ray information into digital data, have become adopted for practical use (please refer to U.S. Pat. No. 5,744,807, for example). In the FPD, an X-ray sensitive layer is arranged on a TFT (thin film transistor) active matrix substrate. The FPD's rapidly became popular, because they have advantages over conventional imaging plates. Specifically, in the FPD's, it is possible to immediately check images and to check not only still images but motion images (video images, moving images or the like).

FIG. 8 is a schematic diagram illustrating the configuration of a conventional FPD. As illustrated in FIG. 8, the conventional FPD includes a multiplicity of radiation detection devices 202 that are two-dimensionally arranged, each including a TFT switch 201. Further, each of the radiation detection devices 202 is connected a scan line (scan wire) 203 for transmitting a control signal for controlling ON/OFF of the TFT switch 201 and a data line (data wire) 204. Signals detected by the radiation detection devices 202 are output to the data lines 204 through the TFT switches 201. Further, a gate driver 205 is connected to the scan lines 203 and a readout circuit 206 is connected to the data lines 204. The gate driver 205 outputs control signals for controlling ON/OFF of the TFT switches 201.

The readout circuit 206 includes charge amplifiers 207 and a multiplexer 208. The charge amplifiers 207 detect charge signals (electric charge signals) that have flowed into the data lines 204 as voltage signals. The multiplexer 208 sequentially switches columns of radiation detection devices and sequentially outputs signals detected by the radiation detection devices line by line.

The readout circuit 206 performs so-called correlated double sampling (CDS). FIG. 9 is a circuit diagram illustrating the readout circuit 206 in detail. As described above, the readout circuit 206 includes the charge amplifiers 207 and the multiplexer 208. Further, the readout circuit 206 includes a first sampling circuit 209, a second sampling circuit 210 and a differential amplifier 211. The first sampling circuit 209 samples the voltage signals output from the charge amplifier 207 and obtains a kTC noise component of the charge amplifier 207 (hereinafter, referred to as kTC noise component). The second sampling circuit 210 samples the voltage signals output from the charge amplifier 207 and obtains a data component. The differential amplifier 211 outputs a difference between the signal of the kTC noise component, which has been obtained by sampling by the first sampling circuit 209, and the signal of the data component, which has been obtained by sampling by the second sampling circuit 210.

Next, the operation of the conventional FPD will be described.

First, when a radiation image is recorded, the FPD is irradiated with radiation. Then, charges corresponding to the dose of the radiation are generated in a radiation sensitive layer of the radiation detection device. A radiation image is recorded by accumulating the charges generated in the radiation detection device.

Next, the action of reading out, by the readout circuit 206, the radiation image recorded in the FPD will be described with reference to FIGS. 8 and 9 and a timing chart illustrated in FIG. 10. In FIG. 10, gate signal Gate, control signal CA_Reset, control signal SH1, control signal SH2, output signal CA_out, ground potential GND, output signal SH1_out and output signal SH2_out are illustrated. The gate signal Gate is output from the gate driver 205 to the scan line 203. The control signal CA_Reset controls a reset switch of the charge amplifier 207. The control signal SH1 controls a switch of the first sampling circuit 209. The control signal SH2 controls a switch of the second sampling circuit 210. The output signal CA_out is output from the charge amplifier 207. The ground potential GND is the ground potential of the charge amplifier 207. The output signal SH1_out is output from the first sampling circuit 209. The output signal SH2_out is output from the second sampling circuit 210.

First, the reset switch CA_Reset of the charge amplifier 207 is opened and the charge amplifier 207 operates in storage mode (accumulation mode). Next, a control signal is output from the gate driver 205 and TFT switches 201 of the radiation detection devices 202 in line L1, which is the rightmost line in FIG. 8, are turned on. Then, charges stored in the radiation detection devices 202 are output to the charge amplifiers 207.

Then, the charge amplifiers 207 start accumulation of the charges. Then, immediately after the charge amplifiers 207 have started accumulation of the charges, the switch SH1 of the first sampling circuit 209 and the switch SH2 of the second sampling circuit 210 are turned on. Then, the switch SH1 of the first sampling circuit 209 is immediately turned off and the signal of the kTC noise component is obtained by sampling by a capacitor of the first sampling circuit 209.

After then, the charge amplifiers 207 accumulate charges only for a predetermined time period. Then, immediately before the reset switch CA_Reset of the charge amplifier 207 is short-circuited, the switch SH2 of the second sampling circuit 210 is turned off. Then, the signal of the data component is obtained by sampling by the capacitor of the second sampling circuit 210.

Next, a switch device 208a in the multiplexer 208 is turned on. Then, the multiplexer 208 outputs the signal of the kTC noise component, which was obtained by sampling by the first sampling circuit 209, and the signal of the data component, which was obtained by sampling by the second sampling circuit 210.

Then, the signal of the kTC noise component output from the first sampling circuit 209 and the signal of the data component output from the second sampling circuit 210 are input to the differential amplifier 211. In the differential amplifier 211, the signal of the kTC noise component is subtracted from the signal of the data component. Accordingly, an image signal on which correlated double sampling has been performed is obtained.

Then, switch devices 208b through 208d in the multiplexer 208 are sequentially turned on. The signal of the kTC noise component obtained by sampling by the first sampling circuit 209 and the signal of the data component obtained by sampling by the second sampling circuit 210 are sequentially output from the multiplexer 208 in a manner similar to the aforementioned process. The differential amplifier 211 sequentially obtains differences. Accordingly, image signals are sequentially obtained. As described above, signals detected by the radiation detection devices 202 in line L1 of the FPD are read out.

Further, in a manner similar to the aforementioned process, signals detected by the radiation detection devices 202 in lines L1 through L4 of the FPD are read out line by line.

Here, when the image signals are read out line by line as described above, an output from the radiation detection device on which readout is performed last among the radiation detection devices in each line connects to GND through surrounding circuits and leakage current flows. Consequently, the GND potential fluctuates. Or, the output from the radiation detection device connects to GND by parasitic capacity and the GND potential fluctuates.

Further, the fluctuation of the potential depends on an output voltage from the radiation detection device on which readout is performed last among the radiation detection devices in each line. Especially, when the radiation detection device is arranged in an area, such as an empty portion without any subject, which is irradiated with a high dose of radiation, the output voltage becomes high. Therefore, an influence from the GND fluctuation becomes significant.

More specifically, as illustrated in the timing chart of FIG. 10, if the output from the radiation detection device on which readout is performed last among the radiation detection devices in a predetermined line ((N-1)th row) is an output voltage corresponding to a high dose, GND at the time of reading out the following line (N-th row) fluctuates. Further, the magnitude (size) of the signal on which correlated double sampling has been performed becomes smaller by the offset fluctuation amount.

The fluctuation of the GND potential influences all of the charge amplifiers 207 in the readout circuit 206. Therefore, image signals for the entire one line are influenced by the fluctuation.

To prevent such influence of the GND fluctuation, the timing of correlated double sampling may be shifted (delayed) until the fluctuated GND potential becomes stable. However, if the timing is shifted in such a manner, the readout time becomes long and it becomes impossible to increase a frame rate.

SUMMARY OF THE INVENTION

In view of the foregoing circumstances, it is an object of the present invention to provide a radiation image detector that can prevent the aforementioned influence of the GND fluctuation without reducing the frame rate.

A radiation image detector according to the present invention is a radiation image detector comprising:

a radiation image detector main-body including radiation detection devices for detecting radiation that are at least linearly arranged;

a switching output unit including a multiplicity of switch devices; and a dummy circuit unit connected to a switch device that is switched last among the multiplicity of switch devices, wherein the switching output unit sequentially switches columns of the radiation detection devices by the switch devices and sequentially outputs signals detected by the radiation detection devices line by line, and wherein after signals are output from the radiation detection devices in a predetermined line, the dummy circuit unit outputs a signal having a magnitude that does not substantially influence signals that will be read out from the radiation detection devices in the following line of the predetermined line.

In the radiation image detector, the dummy circuit unit may be a ground circuit (GND).

Alternatively, the dummy circuit unit may output predetermined low voltage.

Alternatively, the dummy circuit unit may be a device that has low charge generation efficiency.

The dummy circuit unit may include the radiation detection device and a charge amplifier for converting charge signals detected by the radiation detection device into voltage signals and the gain of the charge amplifier may be reduced.

The dummy circuit unit may include the radiation detection device, a charge amplifier for converting charge signals detected by the radiation detection device into voltage signals and an attenuation unit for attenuating the voltage signals output from the charge amplifier.

According to the radiation image detector of the present invention, a dummy circuit unit is connected to a switch device that is switched last among the multiplicity of switch devices, and after signals are output from the radiation detection devices in a predetermined line, the dummy circuit unit outputs a signal having a magnitude that does not influence signals that will be read out from the radiation detection devices in the following line of the predetermined line. Therefore, even if signals stored in the radiation detection device from which the signals are read out last among the radiation detection devices in the predetermined line are signals corresponding to a high dose, it is possible to obtain appropriate signals from the radiation detection devices in the following line of the predetermined line.

DESCRIPTION OF THE PREFERRED EMBODIMENTS

Figure 1:
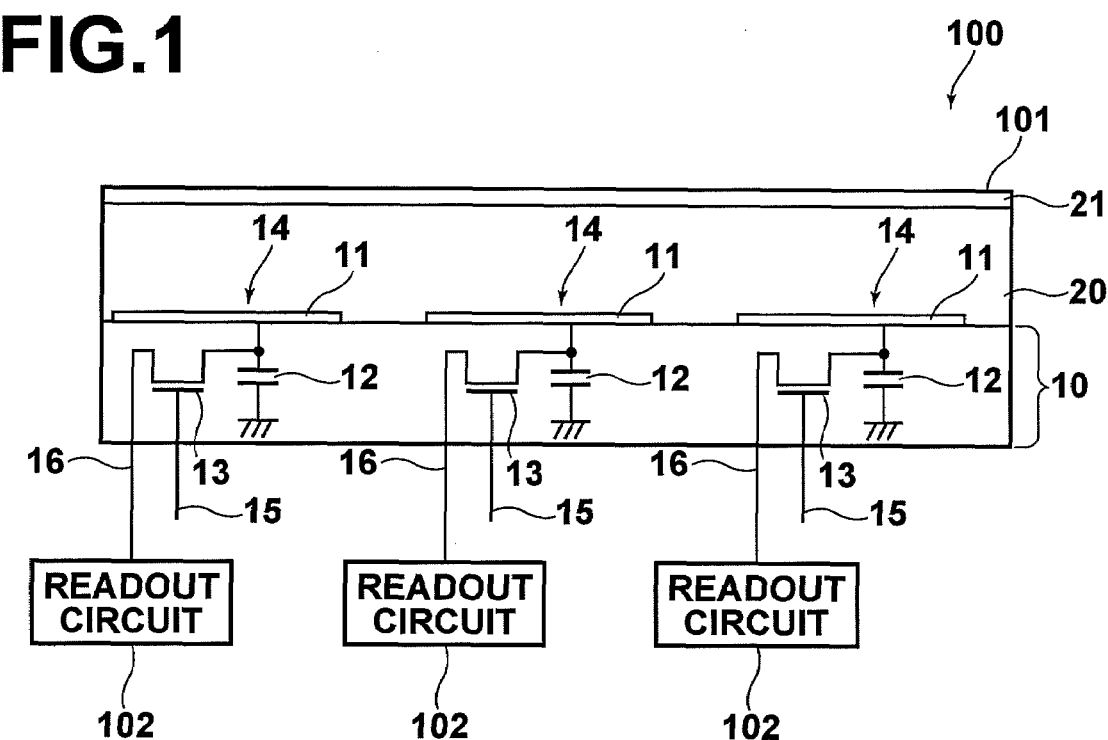
FIG. 1 is a schematic diagram illustrating the configuration of a radiation image detector in a first embodiment of the present invention.

Hereinafter, a first embodiment of a radiation image detector according to the present invention will be described with reference to drawings. FIG. 1 is a schematic diagram illustrating the configuration of a radiation image detector 100 according to the first embodiment of the present invention.

As illustrated in FIG. 1, the radiation image detector 100 includes a radiation image detector main-body 101 and readout circuits 102 for reading out signals detected by the radiation image detector main-body 101.

The radiation image detector main-body 101 includes an active matrix substrate 10, a semiconductor coating (semiconductor layer) 20 and an upper electrode 21. The semiconductor coating 20 is formed on the substantially entire surface of the active matrix substrate 10 and the upper electrode 21 is formed on the semiconductor coating 20.

The semiconductor coating 20 conducts electromagnetic waves. Further, when the semiconductor coating 20 is irradiated with X-rays, charges are generated within the semiconductor coating 20. For example, the semiconductor coating 20 may be an a-Se coating, which is an amorphous coating that contains selenium as its main component, and the thickness of the coating may be 100 to 1000 μm. The semiconductor coating 20 is formed by using a vacuum vapor deposition (evaporation) method.

The upper electrode 21 is made of low-resistance conductive material, such as Au and Al.

The active matrix substrate 10 includes a multiplicity of pixels 14, a multiplicity of scan lines (scan wires) 15 and a multiplicity of data lines (data wires) 16. Each of the multiplicity of pixels 14 includes a collection electrode 11, a storage capacity (capacitance) 12 and a TFT switch 13. The collection electrode 11 collects charges generated in the semiconductor coating 20 and the storage capacity 12 accumulates the charges collected by the collection electrode 11. The TFT switch is used to readout the charges accumulated in the storage capacity 12. The multiplicity of scan lines 15 are used to turn on/off the TFT switches 13 and the multiplicity of data lines 16 are used to read out charges accumulated in the storage capacities 12. The pixels 14 are two-dimensionally arranged. The radiation detection device is composed of the pixels 14, the semiconductor coating 20 and the upper electrode 21. Specifically, in the radiation image detector main-body 101, radiation detection devices for detecting radiation are two-dimensionally arranged.

Generally, as the TFT switch 13, a-Si TFT, which uses amorphous silicon in an active layer, is used.

Further, the end of each of the data lines 16 is connected to one of the readout circuits 102.

Figure 2:
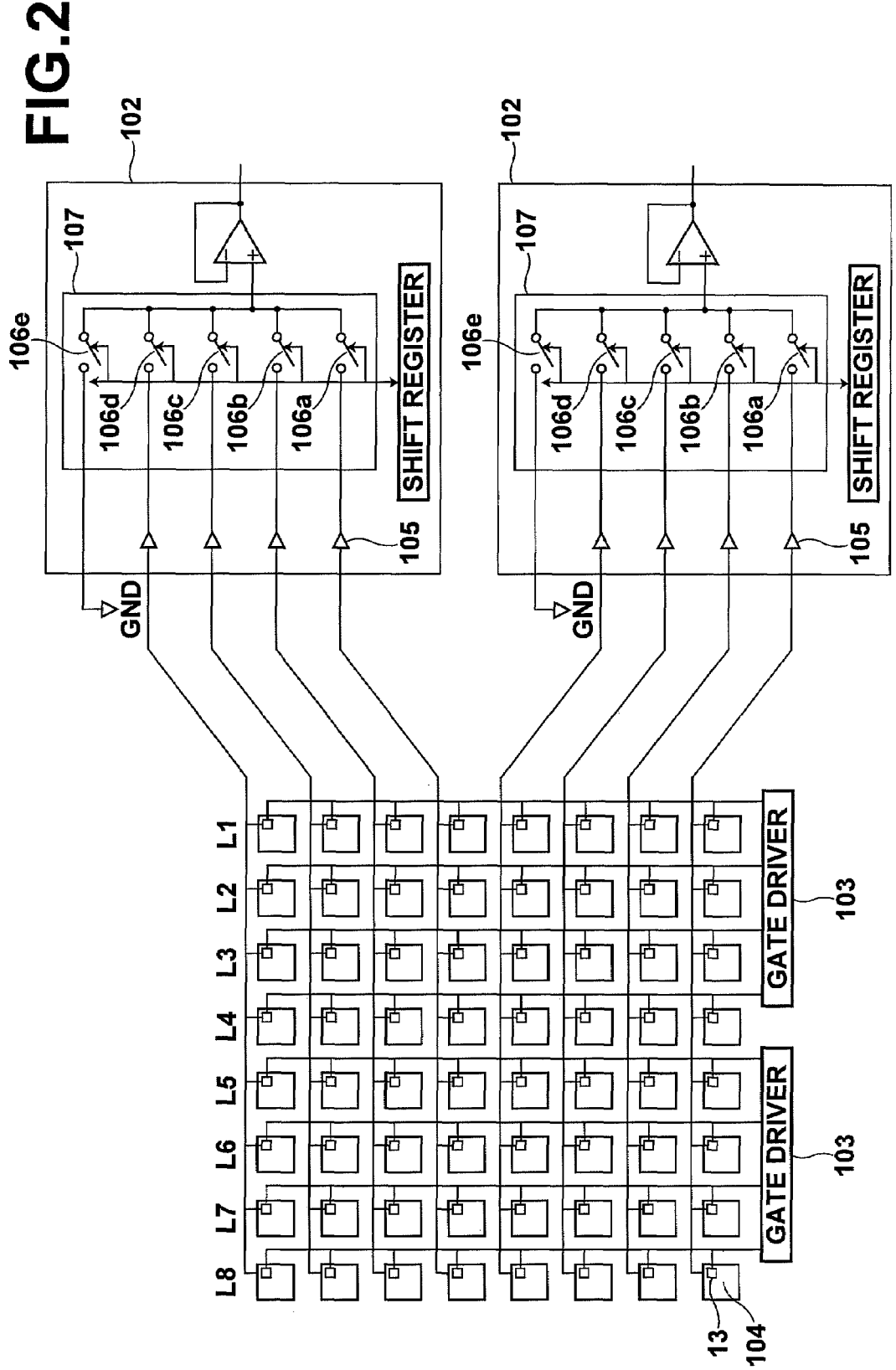
FIG. 2 is a plan view of the radiation image detector in the first embodiment of the present invention.

FIG. 2 is a plan view of the radiation image detector 100.

As illustrated in FIG. 2, in the radiation image detector 100, the scan lines 15 and the data lines 16 are arranged in such a manner that they are orthogonal to each other. Further, the TFT switch 13 is arranged in the vicinity of each intersection between the scan line 15 and the data line 16. Further, as illustrated in FIG. 2, the radiation detection devices 104 are two-dimensionally arranged.

Further, each of the scan lines 15 is connected to one of gate drivers 103. The gate drivers 103 output control signals for controlling ON/OFF of the TFT switches 13.

Further, as described above, each of the data lines 16 is connected to one of the readout circuits 102. In FIG. 2, the readout circuits 102 are illustrated in a simplified manner.

Figure 3:
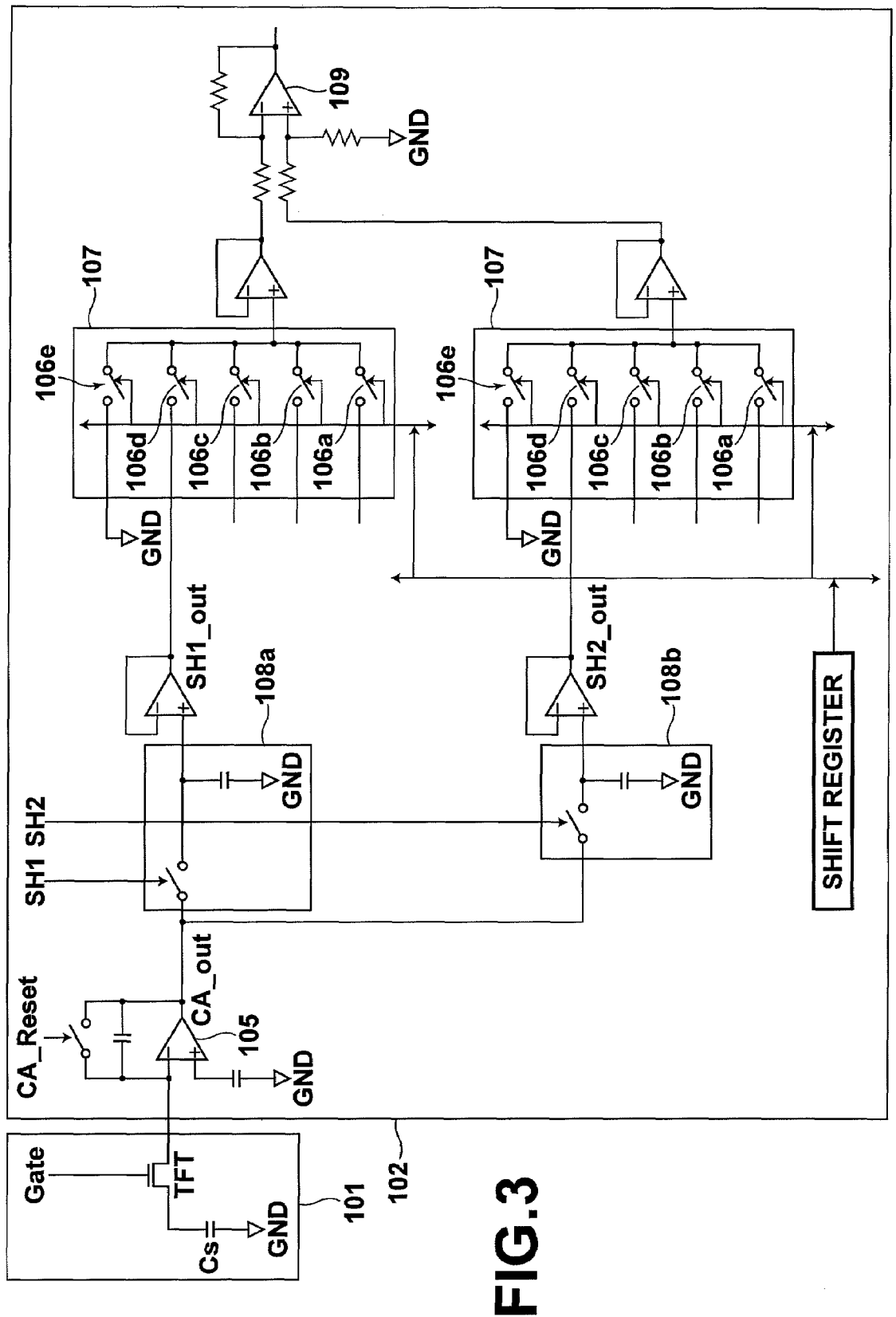
FIG. 3 is a detailed diagram of a readout circuit of the radiation image detector in the first embodiment of the present invention.

FIG. 3 is a diagram illustrating the readout circuit 102 in detail. In FIG. 3, the radiation image detector 100 is illustrated using an equivalent circuit diagram.

The readout circuit 102 performs so-called correlated double sampling. The readout circuit 102 includes a charge amplifier 105, a first sampling circuit 108a, a second sampling circuit 108b, multiplexers 107 and a differential amplifier 109. The charge amplifier 105 outputs a charge signal detected by each of the radiation detection devices 104 in the radiation image detector main-body 101, as a voltage signal. The first sampling circuit 108a obtains a kTC noise component (hereinafter, referred to as a kTC noise component) of the charge amplifier 105 from the voltage signal that has been output from the charge amplifier 105 by sampling the voltage signal. The second sampling circuit 108b obtains a data component from the voltage signal that has been output from the charge amplifier 105 by sampling the voltage signal. Each of the multiplexers 107 has switch devices 106a through 106e and sequentially switches the columns of the radiation detection devices 104 by using the switch devices 106a through 106e. Accordingly, the multiplexer 107 sequentially outputs, line by line, signals that have been detected by the radiation detection devices 104 and obtained by sampling by the first sampling circuit 108a and the second sampling circuit 108b. The differential amplifier 109 outputs a difference between the kTC noise component signal and the data component signal that have been output from the multiplexer 107. Further, although illustrations are omitted in FIG. 3, each of the switch devices 106a through 106c in each of the multiplexers 107, which is other than the switch device 106d, is connected to a sampling circuit, a charge amplifier, the radiation image detector main-body and the like.

Further, the switch device 106e, which will be switched last among the switch devices 106a through 106e in each of the multiplexers 107, is connected to GND (ground, a ground circuit or the like).

Next, the action of the radiation image detector according to the present embodiment will be described.

First, the action of recording a radiation image in the radiation image detector main-body 101 will be described with reference to FIGS. 1 and 2.

When the semiconductor coating 20 is irradiated, from the upper side of FIG. 1, with X-rays that have passed through a subject, charges are generated within the semiconductor coating 20. Then, positive holes (holes) of the charges generated in the semiconductor coating 20 are collected by the collection electrodes 11 by bias between the upper electrode 21 and the collection electrodes 11. Then, the positive charges are accumulated in the storage capacity 12 that is electrically connected to each of the collection electrodes 11. Since the charges generated in the semiconductor coating 20 have different amounts depending on the dose of X-rays with which the semiconductor coating 20 is irradiated, charges that have an amount depending on image information carried by the X-rays are accumulated in the storage capacity 12 of each of the radiation detection devices 104.

Next, the action of reading out the radiation image that has been recorded in the radiation image detector main-body 101 as described above by the readout circuit 102 will be described with reference to FIGS. 2 and 3. The timing chart at the time of readout is similar to the aforementioned diagram.

First, reset switch CA_Reset of the charge amplifier 105 is opened, and the charge amplifier 105 becomes storage mode (accumulation mode). Then, accumulation of charges is started at the charge amplifier 105. Immediately after accumulation of the charges is started at the charge amplifier 105, switch SH1 of the first sampling circuit 108a and switch SH2 of the second sampling circuit 108b are turned on. Then, the switch SH1 of the first sampling circuit 108a is turned off after a predetermined time period has passed and kTC noise component (hereinafter, referred to as kTC noise component) signals of the charge amplifier are obtained by sampling by a capacitor of the first sampling circuit 108a. After then, the charge amplifier 105 accumulates predetermined charges. While the charges are accumulated, a control signal is output from the gate driver 103 and TFT switches 13 of the radiation detection devices 104 in line L1, which is the rightmost line in FIG. 2, are turned on. Since ON/OFF of the TFT switches 13 is performed during the accumulation time period, field-through components induced by ON and OFF of the TFT switches are cancelled. Accordingly, an output, in which an output corresponding to the generated charges is superimposed on the kTC component, is obtained. Then, immediately before the reset switch CA_Reset of the charge amplifier 105 is short-circuited, the switch SH2 of the second sampling circuit 108b is turned off. Further, data component signals are obtained by sampling by a capacitor of the second sampling circuit 108b. Then, the reset switch CA_Reset of the charge amplifier 105 is short-circuited and the charge amplifier 105 becomes reset mode. Accordingly, the charges accumulated in the capacitor of the charge amplifier 105 are discharged.

Next, the switch device 106a of the multiplexer 107 is turned on and the kTC noise component signal obtained by sampling by the first sampling circuit 108a and the data component signal obtained by sampling by the second sampling circuit 108b are output from the multiplexer 107. Then, the kTC noise component signal output from the first sampling circuit 108a and the data component signal output from the second sampling circuit 108b are input to the differential amplifier 109. In the differential amplifier 109, the kTC noise component signal is subtracted from the data component signal and an image signal on which correlated double sampling has been performed is obtained. Then, the switch devices 106b through 106d in the multiplexer 107 are sequentially turned on and the kTC noise component signals obtained by sampling by the first sampling circuit 108a and the data component signals obtained by sampling by the second sampling circuit 108b are sequentially output from the multiplexer 107 in a manner similar to the aforementioned process. At the differential amplifier 109, differences are sequentially obtained and image signals are sequentially obtained. Next, when the switch device 106e, which is switched last among the switch devices in the multiplexer 107, is turned on, the switch device 106e is connected to GND. As described above, signals detected by the radiation detection devices 104 in line L1 of the radiation image detector main-body 101 are read out.

Then, the reset switch CA_Reset of the charge amplifier 105 is opened again and the charge amplifier 105 becomes storage mode. Then, a control signal is output from the gate driver 103 and TFT switches of the radiation detection devices 104 in line L2, which is the second line from the right in FIG. 2, are turned on. The charges accumulated in the radiation detection devices 104 are output to the charge amplifier 105. Then, in a manner similar to the aforementioned process, the kTC noise component and the data component signal are obtained by sampling by the first sampling circuit 108a and the second sampling circuit 108b. Further, image signals are sequentially obtained by sequentially switching the switch devices 106a through 106d in the multiplexer 107. The switch device 106e in the multiplexer 107 is turned on last and connected to GND. As described above, signals detected by the radiation detection devices 104 in line L2 of the radiation image detector main-body 101 are read out.

Then, signals detected by the radiation detection devices 104 in lines L3 through L8 of the radiation image detector main-body 101 are sequentially read out line by line.

As described above, signals detected by all of the radiation detection devices 104 of the radiation image detector main-body 101 are read out. Accordingly, image signals representing an image are obtained.

According to the radiation image detector in the first embodiment of the present invention, when a radiation image is read out, the switch device 106e, which is switched last among the switch devices in the multiplexer 107, is connected to GND. Therefore, even if signals accumulated in the radiation detection device 104 from which signals are read out last among radiation detection devices in a predetermined line are signals corresponding to a high dose, it is possible to prevent an influence on signals that will be read out from the radiation detection devices 104 in the following line of the predetermined line.

Figure 4:
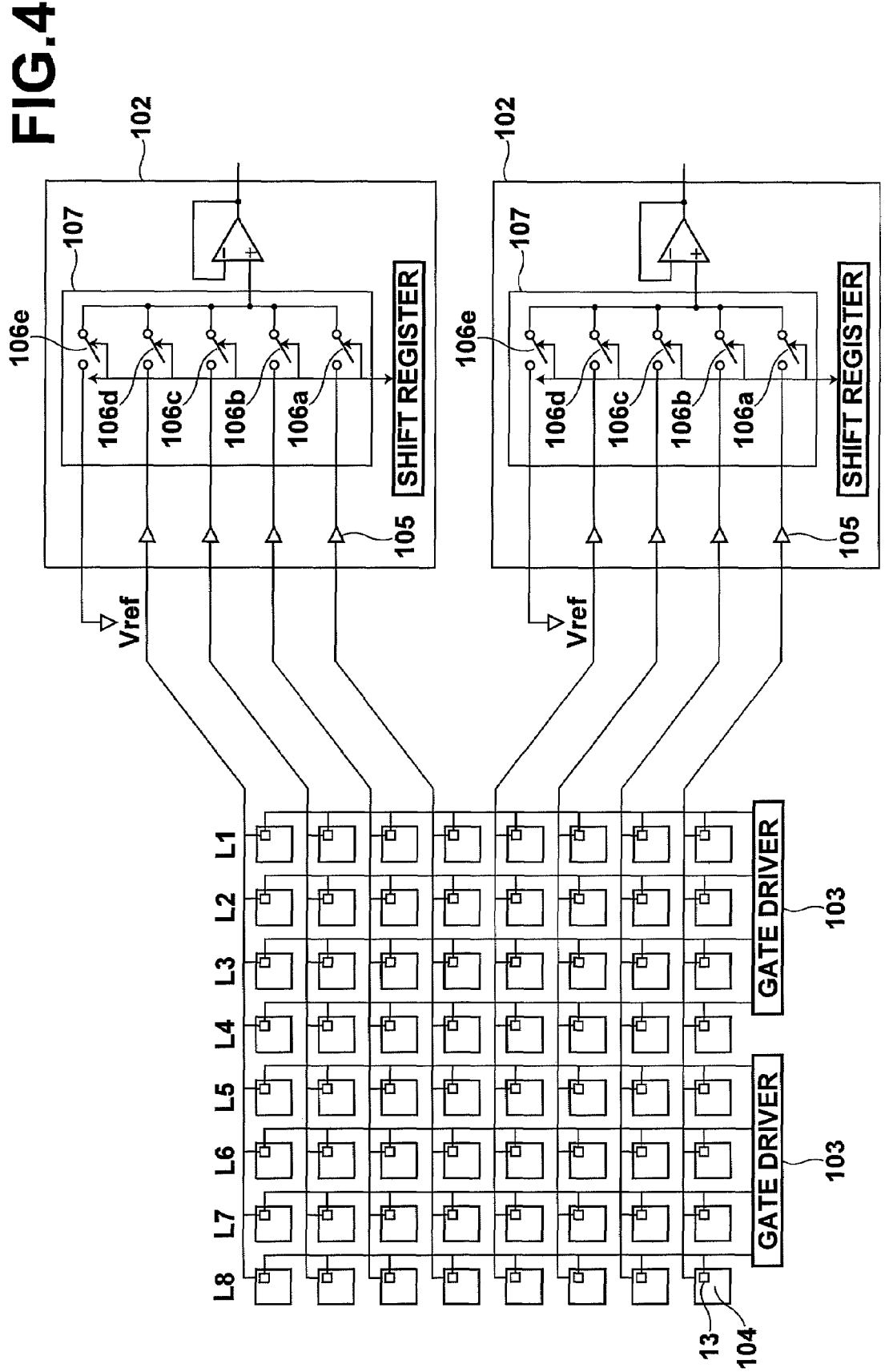
FIG. 4 is a plan view of a radiation image detector in a second embodiment of the present invention.

Next, a second embodiment of a radiation image detector according to the present invention will be described. FIG. 4 is a plan view of the radiation image detector according to the second embodiment.

In the radiation image detector according to the first embodiment, the switch device 106e, which is switched last among the switch devices in the multiplexer 107, is connected to GND. In contrast, in the radiation image detector according to the second embodiment, the switch device 106e is not connected to GND but to predetermined low reference voltage Vref. The reference voltage Vref maybe a reference voltage of the charge amplifier 105. Alternatively, the reference voltage may have a different voltage value that is close to the reference voltage.

The remaining configuration and the action for recording and reading out radiation images are similar to the radiation image detector of the first embodiment.

In the radiation image detector according to the second embodiment, the switch device 106e, which is switched last among the switch devices in the multiplexer 107, is connected to predetermined low voltage Vref. Therefore, even if the signals accumulated in the radiation detection device 104 from which the signals are read out last among the radiation detection devices 104 in a predetermined line are signals corresponding to a high dose, it is possible to prevent signals that will be read out from the radiation detection devices 104 in the following line of the predetermined line from being influenced by the signals corresponding to the high dose. In other words, it is possible to prevent such influence on readout of signals from the following line of the predetermined line.

Figure 5:
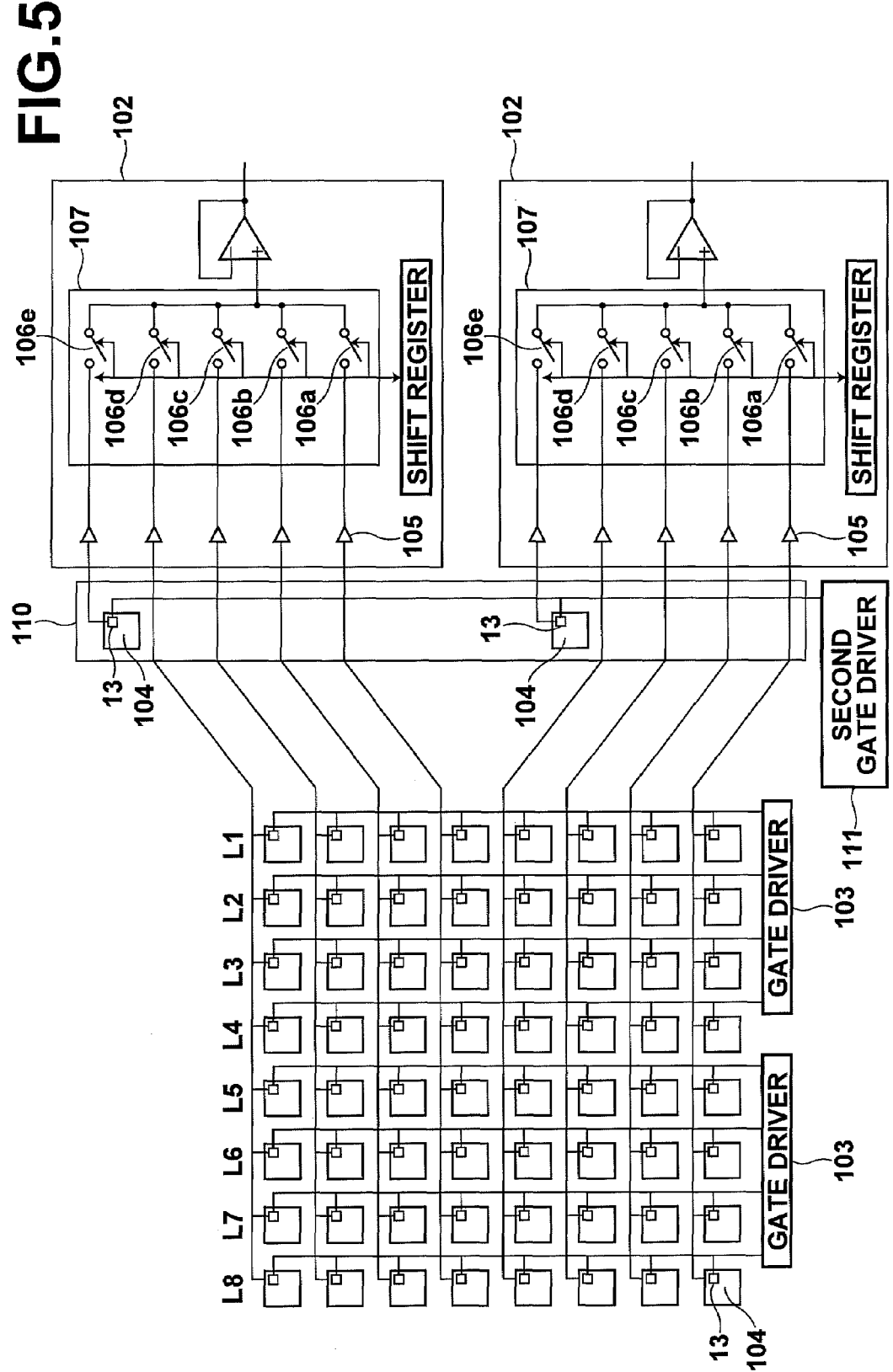
FIG. 5 is a plan view of a radiation image detector in a third embodiment of the present invention.

Next, a third embodiment of a radiation image detector of the present invention will be described. FIG. 5 is a plan view illustrating the radiation image detector according to the third embodiment.

In the radiation image detector according to the first embodiment, the switch device 106e, which is switched last among the switch devices in the multiplexer 107, is connected to GND. However, in the radiation image detector according to the third embodiment, the switch device 106e is not connected to GND but to an X-ray black pixel.

Specifically, as illustrated in FIG. 5, the X-ray black pixel includes a radiation detection device 104 and a radiation shield member 110. The radiation shield member 110 is provided on a radiation-irradiation side of the radiation detection device 104 and has a low transmissivity with respect to radiation. As the material of the radiation shield member 11, Pb or the like may be used, for example.

The radiation detection device 104 of the X-ray black pixel is driven by a second gate driver 111 and outputs signals.

The remaining configuration and the action for recording and reading out radiation images are similar to the radiation image detector of the first embodiment.

In the radiation image detector according to the third embodiment, the switch device 106e, which is switched last among the switch devices in the multiplexer 107, is connected to the X-ray black pixel. Therefore, even if the signals accumulated in the radiation detection device 104 from which the signals are read out last among the radiation detection devices 104 in a predetermined line are signals corresponding to a high dose, it is possible to prevent signals that will be read out from the radiation detection devices 104 in the following line of the predetermined line from being influenced.

Further, in the radiation image detector according to the third embodiment, the X-ray black pixel is composed of the radiation detection device 104 and the radiation shield member 110. However, it is not necessary that the X-ray black pixel is composed of such elements. For example, the X-ray black pixel may be formed by substantially suppressing generation of charges by forming the semiconductor coating 20 in such a manner the semiconductor coating 20 is not provided at the radiation detection device 104. Alternatively, the X-ray black pixel may be formed, as a device that has low charge generation efficiency, by lowering the aperture ratio of the radiation detection device 104, by reducing the size of the radiation detection device 104, by changing the structure of the device or the like.

Further, the radiation image detectors according the aforementioned embodiments are so-called direct-conversion-type radiation image detectors. However, the present invention may be applied to so-called indirect-conversion-type radiation image detectors. In the indirect-conversion-type radiation image detector, a phosphor layer is provided on the upper electrode and radiation is temporarily converted into light by the phosphor. Then, charges are generated by irradiation with the light. When the present invention is applied to the indirect-conversion-type radiation image detector, a radiation shield member, which has a low transmissivity with respect to radiation, may be provided on the phosphor layer of the radiation detection device 104 connected to the switch device 106e in a manner similar to the radiation image detector according to the third embodiment. Alternatively, a member that has a low transmissivity with respect to light output from the phosphor layer may be provided between the upper electrode and the phosphor layer of the radiation detection device 104 that is connected to the switch device 106e. Alternatively, the radiation image detector 104 may be formed in such a manner that a phosphor is not arranged on the upper electrode of the radiation detection device 104 that is connected to the switch device 106e.

Figure 6:
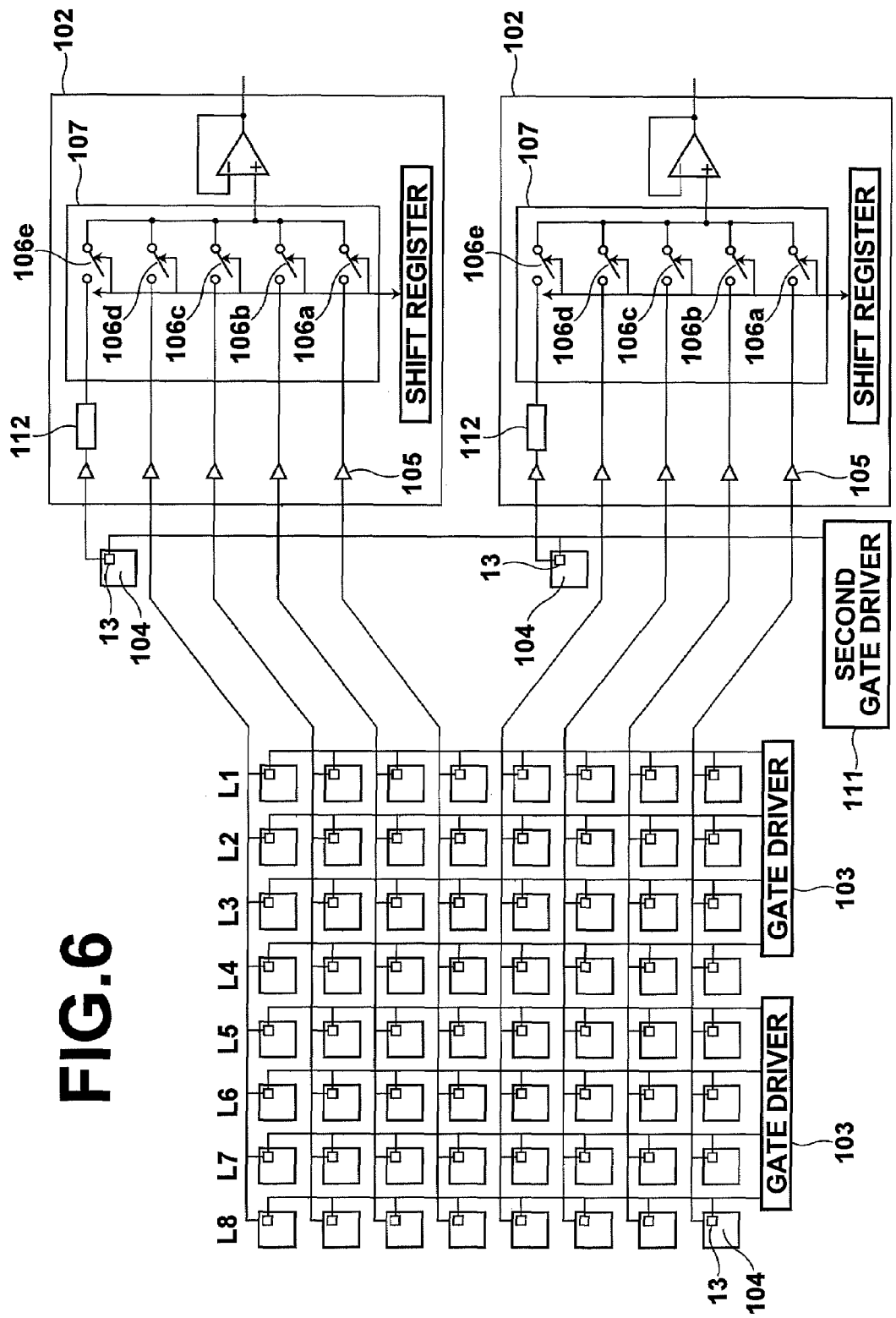
FIG. 6 is a plan view of a radiation image detector in a fourth embodiment of the present invention.

Next, a fourth embodiment of a radiation image detector of the present invention will be described. FIG. 6 is a plan view illustrating the radiation image detector according to the fourth embodiment.

As illustrated in FIG. 6, in the radiation image detector according to the fourth embodiment, the radiation detection device 104, the charge amplifier 105 and an attenuator 112 are connected to the switch device 106e, which is switched last among the radiation image detectors in the multiplexer 107. The attenuator 112 reduces the magnitude (size) of the voltage signal output from the charge amplifier 105.

The remaining configuration and the action for recording and reading out radiation images are similar to the radiation image detector of the first embodiment.

In the radiation image detector according to the fourth embodiment, the attenuator 112 is provided for the switch device 106e, which is switched last among the switch devices in the multiplexer 107, and the magnitude (size) of the signal detected by the switch device 106e is reduced in a sufficient manner. Therefore, even if signals accumulated in the radiation detection device 104 from which signals are read out last among the radiation detection devices in a predetermined line are signals corresponding to a high dose, it is possible to prevent signals that will be read out from the radiation detection devices 104 in the following line of the predetermined line from being influenced.

In the radiation image detector according to the fourth embodiment, the magnitude of the signal detected by the radiation detection device 104 that is connected to the switch device 106e is reduced by providing the attenuator 112. However, it is not necessary that the attenuator 112 is provided. Alternatively, the gain of the charge amplifier 105 that is connected to the switch device 106e may be reduced, for example.

Further, the radiation image detector main-body in the aforementioned embodiments uses a so-called TFT readout method. However, the present invention may be applied to a so-called light-readout-type radiation image detector. The light-readout-type radiation image detector is disclosed in U.S. Pat. No. 6,268,614, for example. In the radiation image detector disclosed in U.S. Pat. No. 6,268,614, a first electrode layer, a photoconductive layer for recording, a charge transfer layer, a photoconductive layer for readout and a second electrode layer are superposed one on another in this order. The first electrode layer transmits radiation and the photoconductive layer for recording exhibits photoconductivity by irradiation with radiation. The charge transfer layer substantially acts as an insulator with respect to charges that have the same polarity as that of latent charges and substantially acts as a conductor with respect to transfer charges that have an opposite polarity to the polarity of the latent charges. The photoconductive layer for readout exhibits photoconductivity by irradiation with readout light. The second electrode layer includes a multiplicity of linear electrodes that transmit the readout light. In the light-readout-type radiation image detector, signal charges (latent charges) that carry image information are accumulated at the interface (a charge accumulation portion) between the photoconductive layer for recording and the charge transfer layer. Further, in the radiation image detector, the radiation detection device is composed of a part of each of the first electrode layer, the photoconductive layer for recording, the charge transfer layer, the photoconductive layer for readout and linear electrodes in the second electrode layer. In other words, the radiation image detector main-body of the present invention may be the radiation image detector main-body of the light readout type.

Figure 7:
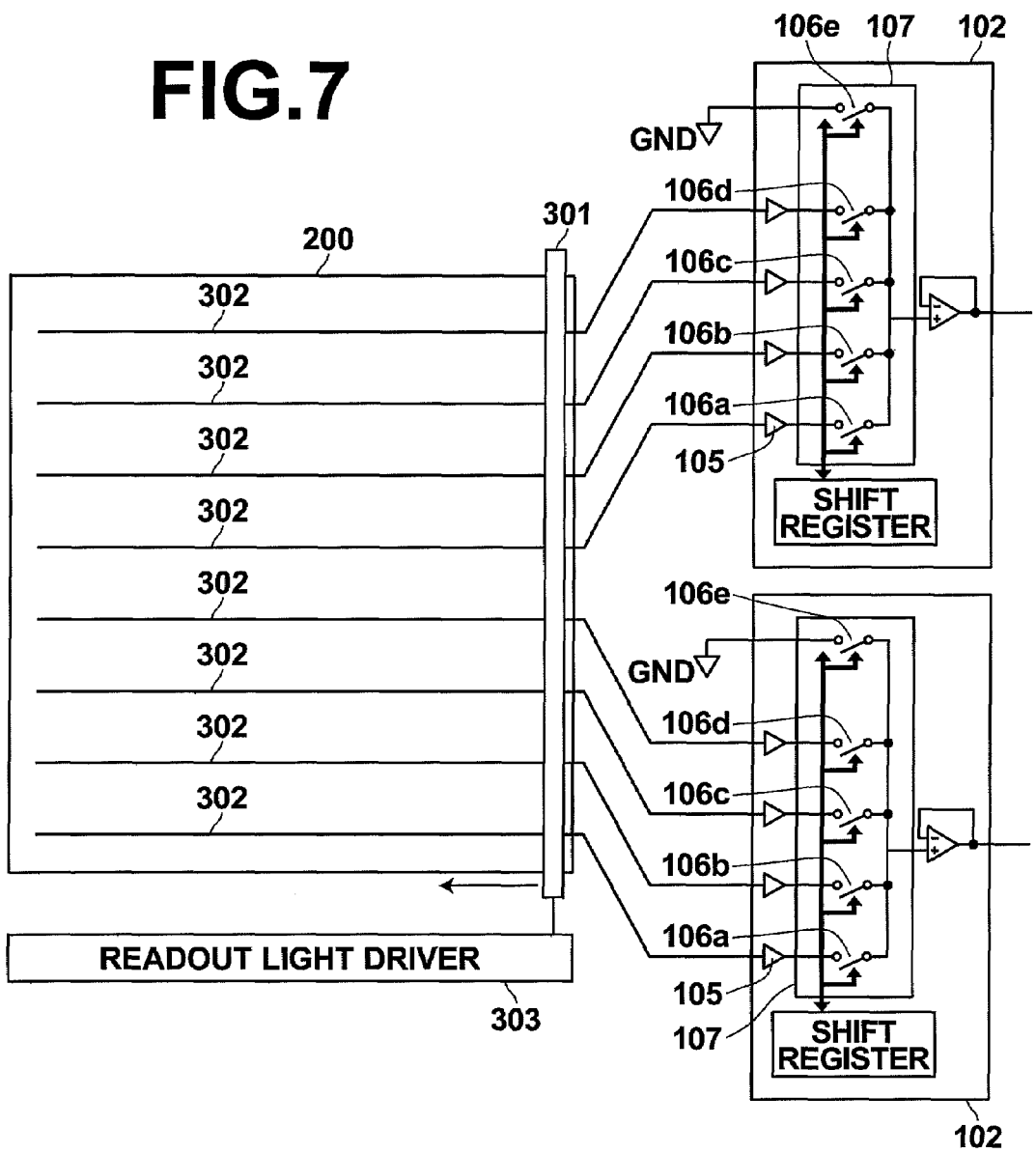
FIG. 7 is a plan view of a radiation image detector in another embodiment of the present invention.
Figure 8:
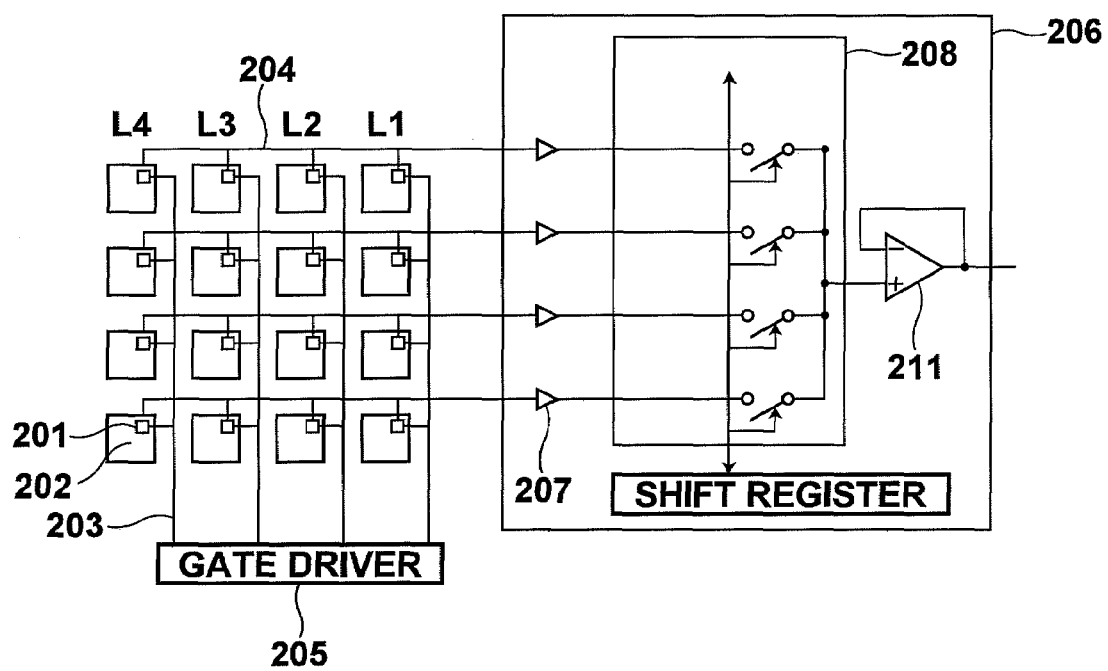
FIG. 8 is a schematic diagram illustrating the configuration of a conventional FPD.
Figure 9:
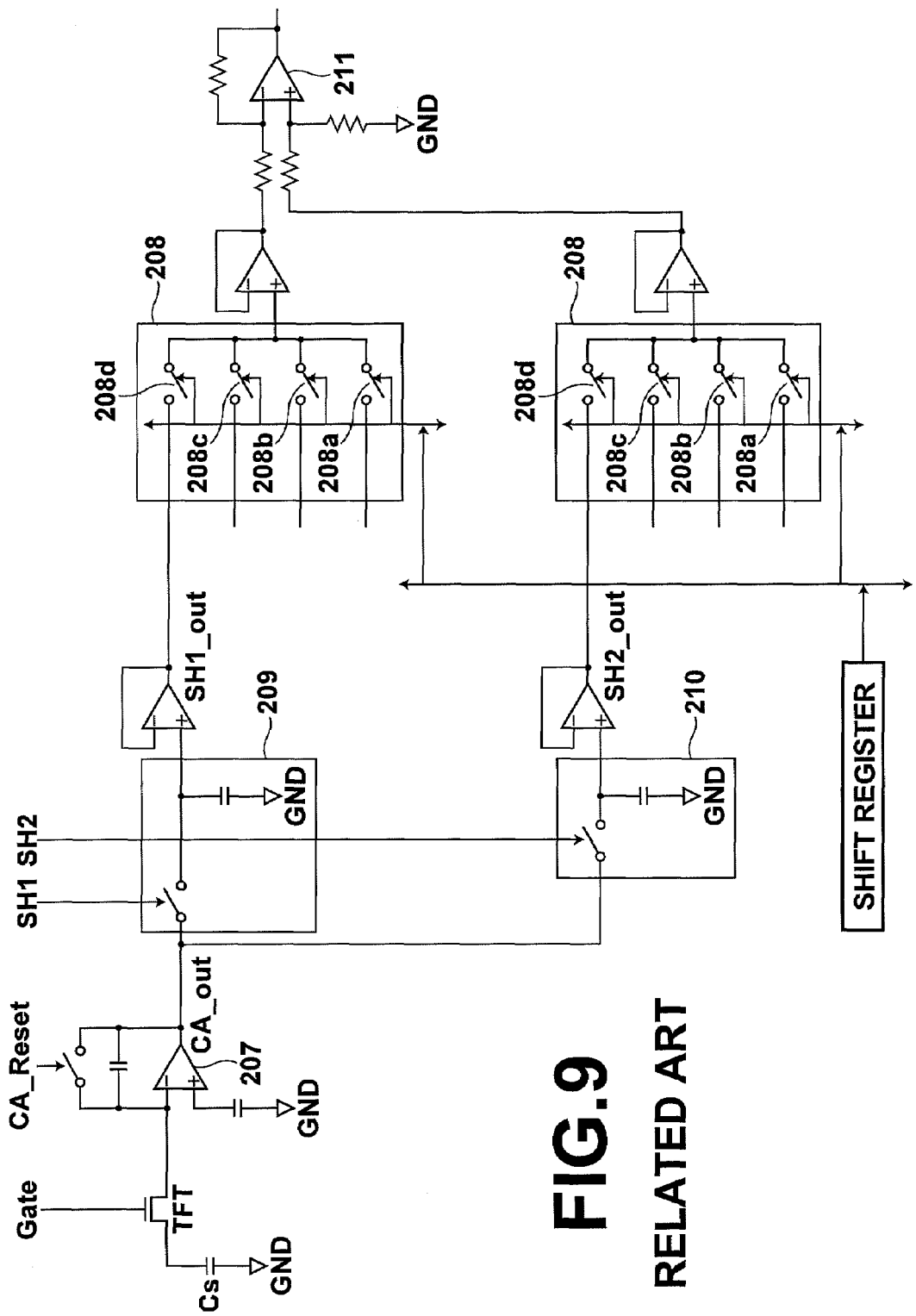
FIG. 9 is a detailed diagram of a readout circuit of the conventional FPD.
Figure 10:
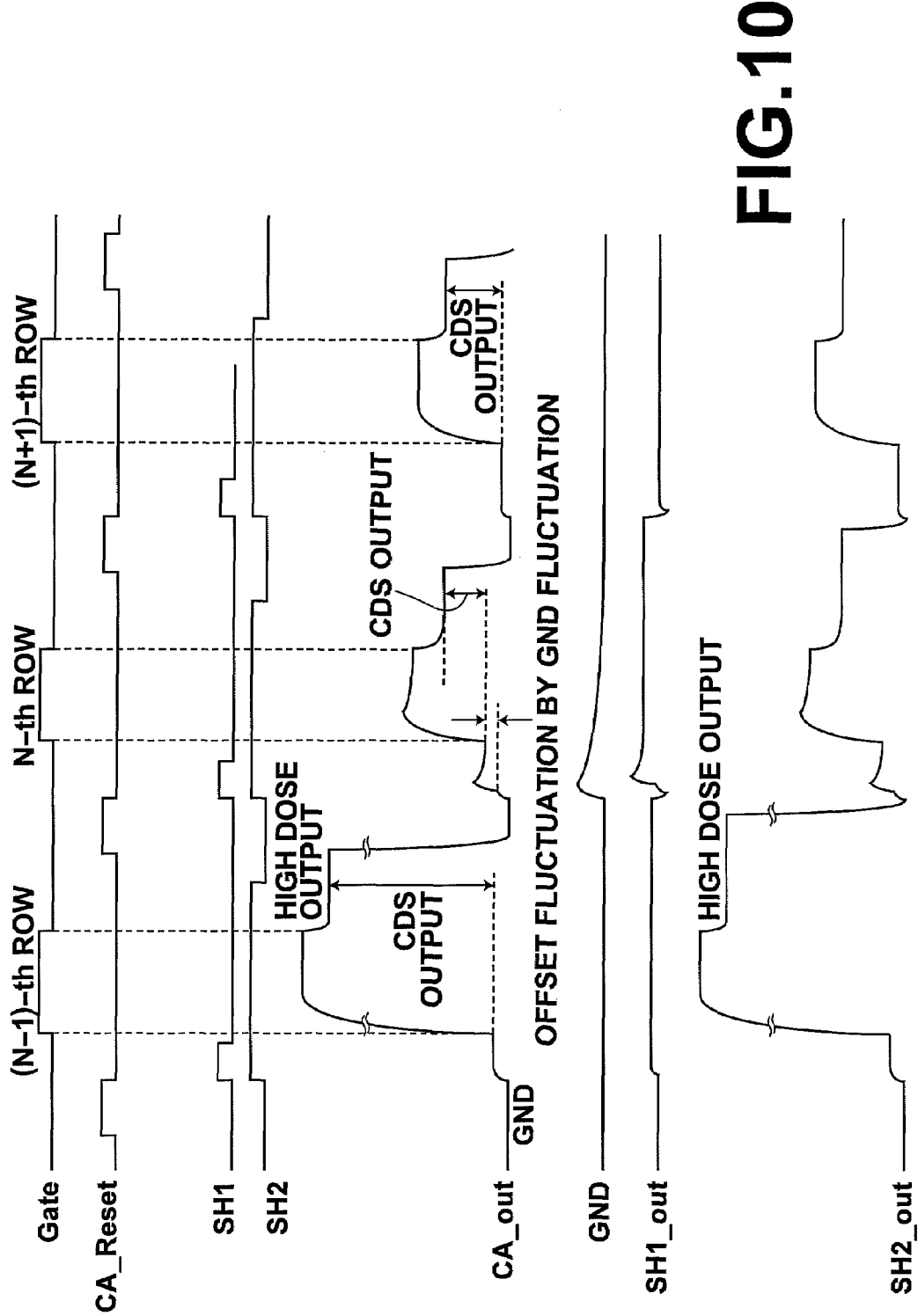
FIG. 10 is a timing chart illustrating the operation of the readout circuit when a radiation image is read out from the radiation image detector.

Then, as illustrated in FIG. 7, each of the linear electrodes 302 in the second electrode layer of the light-readout-type radiation image detector main-body 200 is connected to one of the readout circuits 102 in a manner similar to the radiation image detector according to the aforementioned embodiments.

When a radiation image is recorded in the light-readout-type radiation image detector, first, the radiation image detector is irradiated with radiation from the first electrode layer side while predetermined high voltage is applied to the first electrode layer. The radiation passes through the first electrode layer and irradiates the photoconductive layer for recording and charges are generated in the photoconductive layer for recording. Among the charges generated in the photoconductive layer for recording, charges that have one of the polarities combine with charges that have charged (electrified) the first electrode layer. Among the charges generated in the photoconductive layer for recording, charges that have the opposite polarity to the one of the polarities are accumulated in the accumulation portion at the interface between the photoconductive layer for recording and the charge transfer layer. Accordingly, a radiation image is recorded.

When the radiation image that has been recorded as described above is read out, the radiation image detector is irradiated with linear readout light from the second electrode side by a linear light source 301. The readout light passes through the linear electrodes and irradiates the photoconductive layer for readout and charges are generated in the photoconductive layer for readout. Then, among the charges generated in the photoconductive layer for readout, charges that have one of the polarities combine with charges accumulated in the charge accumulation portion. Among the charges generated in the photoconductive layer for readout, charges that have the opposite polarity to the one of the polarities flow out from each of the linear electrodes 302. Then, sampling is performed on the flowed charges in a manner similar to the aforementioned embodiment. The first sampling circuit 108a and the second sampling circuit 108b in the readout circuit 102, which are connected to each of the linear electrodes 302, perform sampling on the flowed charges. Accordingly, the first sampling circuit 108a obtains a kTC noise component signal by sampling and the second sampling circuit 108b obtains a data component signal by sampling. Further, correlated double sampling is performed by sequentially switching the switch devices 106a through 106d in the multiplexer 107. Accordingly, image signals are sequentially obtained. Finally, the switch device 106e in the multiplexer 107 is turned on and connected to GND. As described above, image signals in one line of the radiation image detector main-body 200 are read out.

Next, a readout-light driver 303 drives the readout-light source 301 in the direction of an arrow (the length direction of the linear electrode 302) illustrated in FIG. 7. Accordingly, the radiation image detector main-body 200 is sequentially scanned with linear readout light. Then, correlated double sampling is performed, based on the scan, line by line at predetermined timing as described above. Accordingly, image signals of the whole radiation image are read out.

What is claimed is:

1. A radiation image detector comprising:
   a radiation image detector main-body including radiation detection devices for detecting radiation that are at least linearly arranged;
   a switching output unit including a multiplicity of switch devices; and
   a dummy circuit unit connected to a switch device that is switched last among the multiplicity of switch devices, wherein the switching output unit sequentially switches columns of the radiation detection devices by the switch devices and sequentially outputs signals detected by the radiation detection devices line by line, and wherein after signals are output from the radiation detection devices in a predetermined line, the dummy circuit unit outputs a signal having a magnitude that does not substantially influence signals that will be read out from the radiation detection devices in the following line of the predetermined line.

2. A radiation image detector, as defined in claim 1, wherein the dummy circuit unit is a ground circuit.

3. A radiation image detector, as defined in claim 1, wherein the dummy circuit unit outputs predetermined low voltage.

4. A radiation image detector, as defined in claim 1, wherein the dummy circuit unit is a device that has low charge generation efficiency.

5. A radiation image detector, as defined in claim 1, wherein the dummy circuit unit includes the radiation detection device and a charge amplifier for converting charge signals detected by the radiation detection device into voltage signals, and wherein the gain of the charge amplifier is reduced.

6. A radiation image detector, as defined in claim 1, wherein the dummy circuit unit includes the radiation detection device, a charge amplifier for converting charge signals detected by the radiation detection device into voltage signals and an attenuation unit for attenuating the voltage signals output from the charge amplifier.

* * * * *